US010875533B2

(12) United States Patent
Kraftschik et al.

(10) Patent No.: US 10,875,533 B2
(45) Date of Patent: Dec. 29, 2020

(54) METHOD AND SYSTEM FOR AUTOMATICALLY DETECTING A COUPLING MANEUVER OF A TRANSPORTATION VEHICLE TO A TRAILER

(71) Applicant: VOLKSWAGEN AKTIENGESELLSCHAFT, Wolfsburg (DE)

(72) Inventors: Simon Kraftschik, Wolfenbüttel (DE); Philipp Hüger, Rühen (DE); Sascha Ziebart, Wettmershagen Calberlah (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/519,035

(22) Filed: Jul. 23, 2019

(65) Prior Publication Data
US 2020/0031353 A1 Jan. 30, 2020

(30) Foreign Application Priority Data
Jul. 25, 2018 (DE) .......................... 10 2018 212 401

(51) Int. Cl.
*B60W 30/18* (2012.01)
*B60D 1/36* (2006.01)
(Continued)

(52) U.S. Cl.
CPC ......... *B60W 30/18036* (2013.01); *B60D 1/36* (2013.01); *B60R 1/00* (2013.01); *B60R 11/04* (2013.01); *B60R 2300/808* (2013.01)

(58) Field of Classification Search
CPC ..... B60W 30/18036; B60D 1/36; B60D 1/06; B60D 1/62; B60R 1/00; B60R 11/04; B60R 2300/808; G06K 9/00791; B62D 15/0285

See application file for complete search history.

(56) References Cited

U.S. PATENT DOCUMENTS

| 2009/0236825 A1 | 9/2009 | Okuda et al. |
| 2011/0001614 A1 | 1/2011 | Ghneim |

(Continued)

FOREIGN PATENT DOCUMENTS

| DE | 10302545 A1 | 7/2004 |
| DE | 102004043761 A1 | 3/2006 |

(Continued)

*Primary Examiner* — Yuen Wong
(74) *Attorney, Agent, or Firm* — Barnes & Thornburg LLP

(57) ABSTRACT

A method for automatically detecting a coupling maneuver of a transportation vehicle to a trailer including sensing a change in position of a trailer coupling of the trailer within a reversing camera image of the reversing transportation vehicle; making available a data set which includes respective position profiles for coupling maneuvers carried out during reversing of a reference transportation vehicle to a trailer coupling of a reference trailer; comparing the change in position of the trailer coupling with the position profiles of the data set or making available a calculation formula based on the data set and comparing the change in position of the trailer coupling with the calculation formula; outputting an inquiry as to whether a driver of the transportation vehicle desires automatic activation of a trailer coupling assistant.

8 Claims, 2 Drawing Sheets

(51) Int. Cl.
  *B60R 1/00* (2006.01)
  *B60R 11/04* (2006.01)

(56) References Cited

U.S. PATENT DOCUMENTS

2013/0321634 A1    12/2013  Okano et al.
2017/0267241 A1     9/2017  Matsunaga et al.
2018/0001721 A1*    1/2018  Huger .................... G06T 7/70

FOREIGN PATENT DOCUMENTS

| DE | 102012001380 A1 | 8/2012 |
| DE | 102012220052 A1 | 10/2013 |
| DE | 1020169222581 A1 | 6/2017 |
| DE | 112016001585 T5 | 12/2017 |
| EP | 2174838 A1 | 4/2010 |
| EP | 3263370 A1 | 1/2018 |
| GB | 2415173 A | 12/2005 |
| WO | 2016164118 A2 | 10/2016 |
| WO | 2017009330 A1 | 1/2017 |
| WO | 2018160960 A1 | 9/2018 |

* cited by examiner

METHOD AND SYSTEM FOR AUTOMATICALLY DETECTING A COUPLING MANEUVER OF A TRANSPORTATION VEHICLE TO A TRAILER

PRIORITY CLAIM

This patent application claims priority to German Patent Application No. 10 2018 212 401.9, filed 25 Jul. 2019, the disclosure of which is incorporated herein by reference in its entirety.

SUMMARY

Illustrative embodiments relate to a method and a system for automatically detecting a coupling maneuver of a transportation vehicle to a trailer.

DETAILED DESCRIPTION

Figure 1:
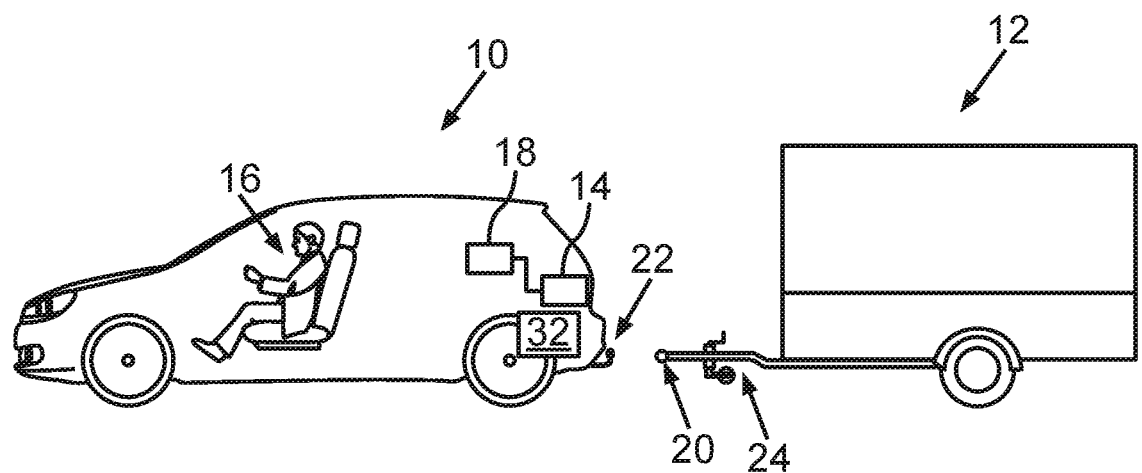
FIG. 1 shows a schematic side view of a transportation vehicle being maneuvered rearward toward a trailer.

A coupling maneuver for coupling a trailer to a transportation vehicle often constitutes a major challenge for many drivers. A trailer coupling of the trailer has to be effected precisely in such a case by a transportation-vehicle-side trailer coupling. However, the trailer coupling of the trailer usually cannot be seen via respective mirrors of the transportation vehicle, or a view to the rear.

The prior art has already disclosed trailer coupling assistants for transportation vehicles which are configured to perform longitudinal guidance and/or transverse guidance of a transportation vehicle to assist a coupling maneuver. US 2009/0236825 A1 presents, for example, such a trailer coupling assistant. This trailer coupling assistant can automatically perform the steering of a transportation vehicle, to simplify a coupling maneuver for coupling the transportation vehicle to a trailer.

However, it can be problematic that a driver firstly has to activate such a trailer coupling assistant manually, for example, by corresponding buttons in the transportation vehicle and by a subsequent selection of the trailer which is to be coupled. The activation of such a trailer coupling assistant can therefore be relatively laborious for a driver. In addition, it may also be the case that transportation vehicle users are not familiar with the installed assistant systems of the respective transportation vehicle, in particular, not with such a trailer coupling assistant, and therefore do not use them.

DE 10 2012 001 380 A1 describes an assistant method for a coupling maneuver of a transportation vehicle. A driver assistance system accesses a reversing camera system to include a trajectory or assistance line on an image displayed on a screen by the reversing camera to assist the coupling maneuver. The trajectory indicates the path on which a trailer coupling of the trailer moves at a predetermined steering lock, to be able to couple the coupling socket of the trailer.

EP 3 263 370 A1 describes a coupling assistant for coupling a transportation vehicle to a trailer. In this context, a driver can mark a tow bar of a trailer which is to be coupled in different zoom stages on a transportation vehicle-side display by which a rear space of the transportation vehicle is displayed, which is intended to contribute to improved detection of the tow bar.

US 2017/0267241 A1 describes a method in which different driver assistance systems for assisting the driving function are proposed to a driver depending on the sensed boundary conditions.

DE 10 2016 222 581 A1 describes a method in which driving patterns are detected by a driver of a transportation vehicle and are subsequently implemented by driver assistance systems.

DE 11 2016 001 585 T5 describes a method in which a driving behavior and surroundings data are sensed, wherein an adaptive cruise control system or, for example, a lane-keeping assistant are activated on the basis thereof.

The disclosed embodiments make available a solution by which a coupling maneuver for coupling a trailer is facilitated for a driver of a transportation vehicle.

This is achieved by a method and by a system for automatically detecting a coupling maneuver of a transportation vehicle to a trailer.

In the disclosed method for automatically detecting a coupling maneuver of a transportation vehicle to a trailer, a change in position of a trailer coupling of the trailer is sensed within a reversing camera image of the reversing transportation vehicle. Furthermore, a data set is made available which comprises respective position profiles for a multiplicity of coupling maneuvers, carried out during reversing, of a reference transportation vehicle to a trailer coupling of a reference trailer, which position profiles characterize respective changes in position of the trailer coupling within a reversing camera image of the reference transportation vehicle. The change in position of the trailer coupling of the reversing transportation vehicle is compared with the position profiles of the data set. Alternatively, a calculation formula is made available on the basis of the data set, and the change in position of the trailer coupling of the reversing transportation vehicle is compared with the calculation formula. As soon as a predefined degree of correspondence to one of the position profiles of the data set or to the calculation formula is determined, a trailer coupling assistant of the transportation vehicle is activated only if the driver should so desire it, which trailer coupling assistant is configured to perform longitudinal guidance and/or transverse guidance of the transportation vehicle to assist the coupling maneuver.

Before the automatic activation, an enquiry is output as to whether a driver of the transportation vehicle desires the automatic activation of the trailer coupling assistant, wherein the automatic activation of the trailer coupling assistant takes place only in the case of confirmation of the enquiry. After the automatic or independent detection of the coupling maneuver planned by the driver, the driver is therefore initially asked whether he desires the automatic activation of the trailer coupling assistant. Only if he confirms this is the trailer coupling assistant also activated, as a result of which the latter then performs the longitudinal guidance and/or transverse guidance of the transportation vehicle to couple the transportation vehicle to the trailer. The enquiry can be output, for example, graphically via a corresponding display within the transportation vehicle. In addition, the enquiry can also be output acoustically via loudspeakers of the transportation vehicle. Therefore, the driver can confirm the enquiry, for example, by corresponding buttons on a touch screen or else by other mechanical buttons or else by a voice command.

As a result of the fact that the trailer coupling assistant is activated only in response to an express driver's request, control is not taken away from the driver and the driver is also not surprised by automatic activation of the trailer coupling assistant. In addition, it is as a result also possible that the trailer coupling assistant is not incorrectly activated if the driver does not wish to carry out a coupling maneuver at all.

By the disclosed method, it is therefore possible to detect autonomously, that is to say automatically, a coupling process which is planned by a driver of the transportation vehicle or is imminent, in this case to automatically activate the trailer coupling assistant of the transportation vehicle—insofar as the driver also previously confirms it. A driver therefore no longer has to activate the trailer coupling assistant independently over a plurality of stages. The basis for the independent detection of the coupling process or coupling maneuver which is planned by the driver or is pending forms here a transportation vehicle sensor system of the transportation vehicle, which sensor system has, inter alia, a reversing camera and a data processing device which is configured to evaluate the images of the reversing camera with respect to the change in position of the trailer coupling and to compare the images with the data set.

Therefore, as soon as a driver reverses with his transportation vehicle, the reversing camera image which is made available by a reversing camera of the transportation vehicle is evaluated. In this context, with algorithms which are known per se a search is firstly made for a trailer coupling of a trailer in the space behind the transportation vehicle. As soon as such a trailer coupling has been detected, a change in position of the trailer coupling during the reversing is continuously sensed within the reversing camera image. Depending on how the driver of the transportation vehicle maneuvers rearward, as the trailer coupling is approached here it can migrate within the reversing camera image in the upward and/or lateral directions.

The data set with the various position profiles can be made available in a memory of the transportation vehicle which is correspondingly suitable for this. This data set can be acquired in advance by virtue of the fact that a multiplicity of coupling maneuvers are carried out during the reversing toward a reference trailer with a suitable reference transportation vehicle. In this context, respective position profiles which characterize respective changes in position of the trailer coupling of the reference trailer within the reversing camera image of the reference transportation vehicle are sensed and stored. All these position profiles ultimately lead to a situation in which the reference transportation vehicle was coupled to the reference trailer. The data set therefore supplies a multiplicity of data items relating to the respective change in position of the trailer coupling within the reversing camera image of the reference transportation vehicle while the transportation vehicle has been repeatedly coupled to the trailer coupling of the reference trailer.

By comparing the change in position of the trailer coupling of the transportation vehicle which is still being maneuvered manually by the respective driver in the rearward direction with the position profiles of the data set it can be determined in a very reliable way whether or not the driver of the respective transportation vehicle would currently actually like to carry out a coupling maneuver to the respective trailer. Alternatively, it is also possible, instead of storing the data set in the transportation vehicle, to make available a calculation formula, based on the data set, in the transportation vehicle. By the calculation formula it is possible, for example, to calculate a gradient of the change in position of the trailer coupling in the camera image and on the basis thereof detect whether the driver of the transportation vehicle would currently like to carry out a coupling maneuver to the respective trailer. By comparing the change in position of the trailer coupling of the transportation vehicle, which is still being maneuvered manually by the respective driver in the rearward direction, with the calculation formula it is therefore possible to determine in a very reliable way whether or not the driver of the respective transportation vehicle would currently actually like to carry out a coupling maneuver to the respective trailer.

As soon as a predefined degree of correspondence to one of the position profiles of the data set or the calculation formula is determined, the trailer coupling assistant of the transportation vehicle is activated automatically if the driver confirms this. As a result, the driver of the transportation vehicle can be supported as well as possible during the coupling maneuver to the trailer in that the activated trailer coupling assistant performs the longitudinal guidance and/or transverse guidance of the transportation vehicle to assist the coupling maneuver. For example, the trailer coupling assistant can fully-automatically steer, accelerate and brake the transportation vehicle until a driver-side trailer coupling has been positioned against the trailer coupling of the respective trailer. It is therefore possible, for example, for a transportation vehicle-side ball head coupling to be positioned in a precisely fitting state underneath a ball head coupling of the trailer, after which, for example, a tow bar of the trailer only has to then be lowered until the ball head coupling of the trailer engages around the ball head coupling of the transportation vehicle.

By the disclosed method, a driver of a transportation vehicle is therefore assisted as well as possible in firstly automatically detecting whether the driver would actually like to carry out a coupling maneuver, in which case, and when the driver desires it, the trailer coupling assistant of the transportation vehicle is activated automatically to assist the driver as well as possible as he maneuvers towards the trailer.

Disclosed embodiments provide that both in the case of the reference transportation vehicle and in the case of the transportation vehicle, a respective position of the trailer coupling with respect to the reversing camera image is additionally also assigned a respective sensed distance between the reference transportation vehicle and the reference trailer or between the transportation vehicle and the trailer. The disclosed embodiments are based here on the realization that when a multiplicity of coupling maneuvers are carried out a certain pattern is formed according to which the respective change in position of the trailer coupling in relation to the reversing camera image takes place with respect to a respective distance between the transportation vehicle and the trailer. As a result of the fact that both in the case of the data set and when the change in position of the currently reversing transportation vehicle is sensed, respective distances are taken into account between the transportation vehicle and the respective trailer, the method can automatically detect in a reliable way whether or not the driver would currently like to carry out a coupling maneuver.

According to a further disclosed embodiment there is provision that the respective distances are determined by odometry. In this way it is possible, in an easy and reliable manner, to reliably determine the respective distance between the respective transportation vehicles and the respective trailers.

In a further disclosed embodiment, there is provision that the data set is divided into a non-linear region, in which the position profiles are curved, and a linear region, in which the position profiles are at least essentially straight up to a coupling region, wherein when the change in position of the trailer coupling is compared with the position profiles of the data set, only the linear region is taken into account, or both the non-linear and the linear region are taken into account. In the linear region, the position profiles are at least essentially all straight, that is to say as a linear line up to a target region which is to be approached for the coupling of the respective trailer to the transportation vehicle. In this linear region it is possible with a low error rate to detect automatically a coupling maneuver planned by a driver, of the transportation vehicle. If, on the other hand, both the non-linear and the linear region are taken into account, it is possible at an early time, in particular, in the non-linear region, to detect a planned coupling maneuver. However, this involves somewhat increased expenditure on computing, since extrapolation has to be carried out with a function of a relatively high order. Therefore, in contrast to the exclusive consideration of the linear region, the additional consideration or taking into account of the non-linear region entails the benefit that a planned coupling maneuver can be detected relatively early, but more frequent incorrect estimations can occur than if only the linear region is taken into account. Both procedures therefore entail certain benefits.

The disclosed embodiments provide that the change in position of the trailer coupling of the trailer is determined exclusively in the transverse direction of the camera image in relation to a respective distance between the transportation vehicle and the trailer and is compared with the position profiles of the data set, which position profiles themselves comprise exclusively the changes in position of the trailer coupling of the reference trailer in the transverse direction in relation to a respective distance between the reference transportation vehicle and the reference trailer. This procedure is based on the realization that, in relation to the respective change in position of the trailer couplings in the transverse direction of the camera image it is possible to detect a linear profile early, that is to say already at relatively large distances between the transportation vehicle and trailer. In other words, a linear profile of the change in position of the trailer coupling toward a target region is already present at a relatively large distance in contrast to a change in position in the vertical direction of the camera image. Even in the case of a full steering lock, a linear profile relating to the change in position of the trailer coupling can already be detected within the camera image at a distance of four meters. At smaller steering angles this is the case even earlier, that is to say already at much larger distances between the transportation vehicle and the trailer. Therefore, this approach provides that a coupling maneuver of the driver can already be detected very early. For example, the respective image coordinates of the trailer coupling in the transverse direction of the camera image follow in a range between 2 to 4 meters distance between the transportation vehicle and the trailer. If an approximately linear profile of the change in position of the trailer coupling in relation to the camera image is present during the reversing of the transportation vehicle, a planned coupling process or coupling maneuver can be assumed with a much higher level of safety.

An alternative exemplary embodiment provides that when the change in position of the trailer coupling is compared with the position profiles of the data set, the change in position of the trailer coupling in the transverse direction and the vertical direction of the reversing camera image is taken into account. During this approach, it is therefore possible to implement tracking of the trailer coupling starting from a distance of approximately 1.7 meters, wherein in the case of an approximately linear profile in the direction of the target region it is possible to assume a coupling maneuver by the driver. A benefit of this approach is that only the image of the reversing camera has to be used to anticipate the coupling process. The assistance proposal or the automatic activation of the trailer coupling assistant occurs, however, only relatively close to the trailer in comparison with the other alternative, since the tracking of the trailer coupling has to take place over a certain distance to make this procedure as robust as possible with respect to atypical data.

According to a further disclosed embodiment there is provision that when the change in position of the trailer coupling within the reversing camera image is sensed, individual positions of the trailer coupling on the reversing camera image are determined, and a trend line is drawn through these determined positions, which trend line is compared, during the comparison of the change in position of the trailer coupling, with the position profiles of the data set. Optionally, therefore in each case two successive points or positions are not strictly considered but instead a trend line through a plurality of points or positions is determined. A benefit of this procedure is a resulting significantly lower expenditure on computing. Although this can involve somewhat delayed detection of a planned coupling maneuver, this has, however, a positive effect on the very low error rate.

The disclosed system for automatically detecting a coupling maneuver of a transportation vehicle to a trailer is configured to carry out the disclosed method or an exemplary embodiment of the disclosed method. Disclosed embodiments of the method are to be considered to be refinements of the disclosed system and vice versa, wherein the system comprises, in particular, methods or mechanisms for carrying out the method operations. The system comprises, in particular, a data processing device which is configured to read in and evaluate the data set mentioned above, and to receive and evaluate data from a reversing camera of the transportation vehicle, to sense the change in position of the trailer coupling of the trailer within a reversing camera image of the reversing transportation vehicle. In addition, the data processing device can perform the comparison for each change in position of the trailer coupling and for the position profiles of the data set and determine whether the predefined degree of correspondence to one of the position profiles is present, if appropriate, to bring about automatic activation of the trailer coupling assistant of the transportation vehicle.

Further features and details of the disclosed embodiments are apparent from the following description of exemplary embodiments and with reference to the drawings. The features and combinations of features which are specified above in the description and the features and combinations of features which are shown below in the description of the figures and/or solely in the figures can be used not only in the respectively specified combination but also in other combinations or alone without departing from the scope of the disclosure.

In the figures, identical or functionally identical elements have been provided with the same reference symbols.

A transportation vehicle 10 which is currently approaching the trailer 12 in a rearward direction is shown in a schematic side view in FIG. 1. The transportation vehicle 10 comprises a reversing camera 14 so that when maneuvering rearward toward the trailer 12 the driver 16 can perceive the trailer in the passenger compartment of the transportation vehicle on a display which is not characterized in more detail. In addition, the transportation vehicle 10 also comprises a trailer coupling assistant which is configured to perform longitudinal guidance and/or transverse guidance of the transportation vehicle to assist a coupling maneuver.

The trailer coupling assistant 18 can for this purpose engage, in particular, in the steering, the brakes and the engine control, for example, to maneuver the transportation vehicle 10 fully automatically in a rearward direction up to the trailer 12, specifically in such a way that a trailer coupling 20 of the trailer 12 and a trailer coupling 22 of the transportation vehicle 10 are positioned in a way which matches one another. The trailer coupling assistant 18 can therefore, for example, maneuver the transportation vehicle 10 fully automatically rearward in the direction of the trailer 12, specifically until the trailer coupling 22 of the transportation vehicle 10 is located directly underneath the trailer coupling 20 of the trailer 12. Then, for example, a tow bar 24 of the trailer 12 only then has to be lowered until the two trailer couplings 20, 22 are connected to one another.

A method for automatically detecting a coupling maneuver of the transportation vehicle 10 will be described below with reference to the further figures.

Figure 2:
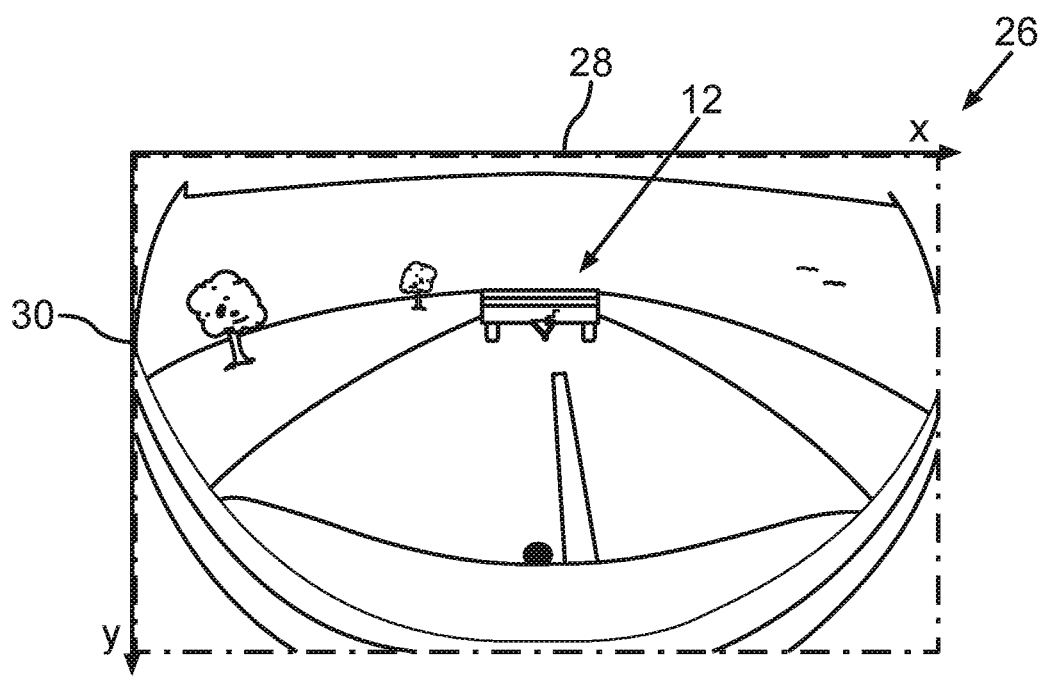
FIG. 2 shows a reversing camera image of a reversing camera of the reversing transportation vehicle while it is approaching the trailer.

FIG. 2 illustrates a reversing camera image 26 which is recorded by the reversing camera 14 of the transportation vehicle 10 during the rearward approaching in the direction of the trailer 12. In this context, an image coordinate system is indicated schematically by respective axes 28, 30, which system characterizes a transverse direction x and a vertical direction y with respect to the reversing camera image 26. To automatically detect a coupling maneuver, possibly planned by the driver 16, of the transportation vehicle 10 to the trailer 12, there is provision for a change in position of the trailer coupling 20 of the trailer 12 within the reversing camera image 26 of the reversing transportation vehicle 10 to be continuously sensed by a system 32 of the transportation vehicle 10.

In addition, by the system 32 a data set is made available which comprises respective position profiles for a multiplicity of coupling maneuvers, carried out during reversing, of a reference transportation vehicle to a trailer coupling of a reference trailer, which position profiles characterize respective changes in position of the trailer coupling within a trailer camera image of the reference transportation vehicle. This data set can be input to a corresponding memory, for example, within the scope of the production of the transportation vehicle 10, so that this data set is available to system 32. Therefore, for example, several hundred reversing movements of the reference transportation vehicle can be stored, which movements related to all coupling maneuvers of the reference transportation vehicle to the reference trailer. This data set therefore contains a multiplicity of positions of the trailer coupling of the reference trailer within a reversing camera image. Therefore, it is possible to make available a wide variety of position profiles which are obtained during the rearward approaching of a trailer. All these position profiles therefore characterize different coupling maneuvers which have led to the coupling of the reference transportation vehicle to the reference trailer.

Figure 3:
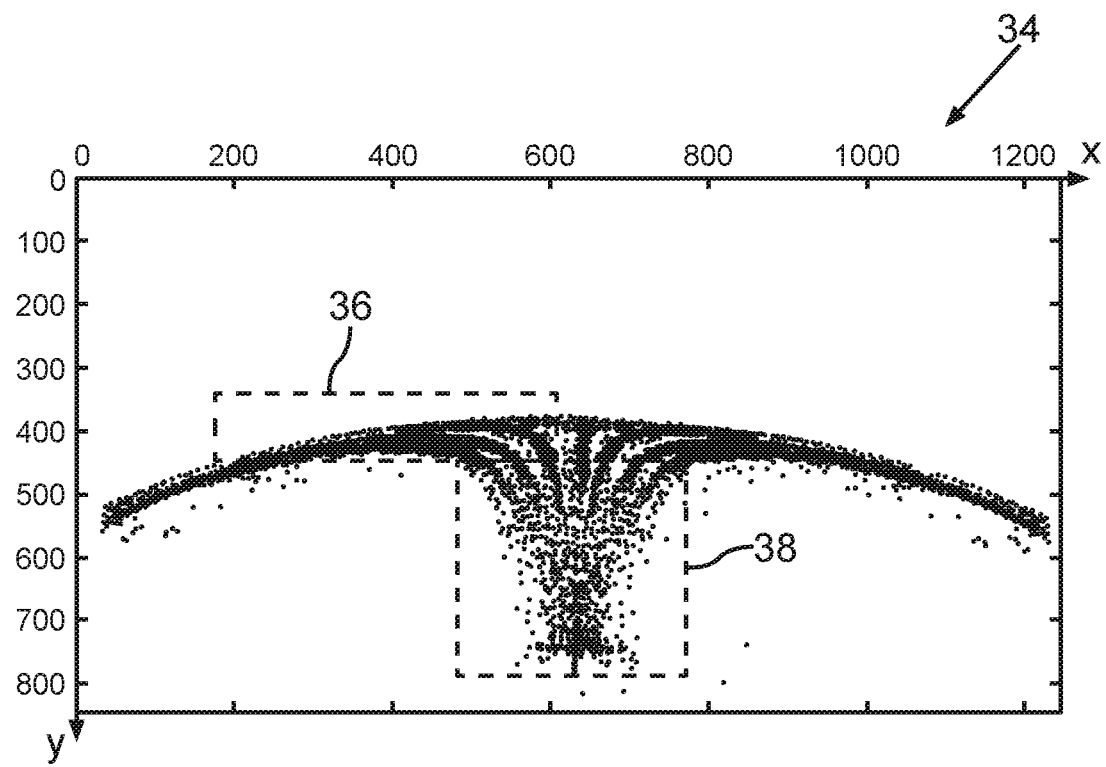
FIG. 3 shows a first illustration of a data set which comprises respective position profiles for a multiplicity of coupling maneuvers, carried out during reversing, of a reference transportation vehicle to a trailer coupling of a reference trailer, which position profiles characterize respective changes in position of the trailer coupling within a reversing camera image of the reference transportation vehicle, wherein the position profiles are plotted in the transverse direction and the vertical direction of the camera image.

FIG. 3 shows a diagram 34 which shows the position profiles for the multiplicity of executed coupling maneuvers. The points which are not denoted in more detail are all various positions of the trailer coupling of the reference trailer, specifically as they have appeared within the reversing camera image of the reference transportation vehicle during the reverse approaching of the reference trailer. These different points and the position profiles resulting from them all reflect different driving maneuvers with different steering angles and orientations of the reference transportation vehicle with respect to the reference trailer. It becomes clear that the trailer coupling always moves on a fixed "screen" in relation to the reversing camera image and lies in a specific target region at the end, in relation to the transverse direction of a coordinate position 580 to 650 and in relation to the vertical direction y at approximately 750. The size of this target region is dependent on how precisely the respective trailer coupling is reached during the manual coupling without an assistance system.

The position profiles can then be divided into two regions which can be considered and evaluated separately for the detection of the coupling maneuver. The data set can be divided, on the one hand, into a non-linear region 36 and into a linear region 38. In the non-linear region 36, the position profiles are curved. In contrast, in the linear region 38 the position profiles are at least essentially straight up to the target region or coupling region.

The changes in position or data from the non-linear region can be processed by extrapolation. A coupling maneuver which is planned by the driver 16 can be detected very early here, but also increases the probability of incorrect detection. In addition, the expenditure on computing is relatively high, since extrapolation has to be carried out with a function of a relatively high order.

In contrast, in the linear region 38, the individual pixels follow toward the target region at least roughly a linear line. In this context, the gradient between individual points can be used. To make the information obtained more robust with respect to atypical data, e.g., as a result of steering corrections of the driver, two successive points may not be considered but rather a trend line is drawn or determined through a plurality of points. The benefit with this procedure is a relatively low expenditure on computing. However, when only the linear region 38 is considered the automatic detection of a coupling maneuver is relatively late with respect to the necessary approaching of the trailer 12 by the transportation vehicle 10. However, the error rate is very low if only the linear region 38 is considered.

Quite generally, for automatic detection of a possible planned coupling maneuver of the driver 16, the actual change in position of the trailer coupling 20 of the trailer 12 is compared with the position profiles of the data set—as illustrated, for example, in FIG. 3. As soon as a predefined degree of correspondence to one of the position profiles is determined, an enquiry is output by the transportation vehicle 10 as to whether the driver 16 desires automatic activation of the trailer coupling assistant 18. Automatic activation of the trailer coupling assistant 18 takes place only in the case of a confirmation by the driver 16. This enquiry can be output, for example, optically and/or acoustically in the passenger compartment of the transportation vehicle, wherein the driver 16 can either confirm or reject, for example, by activating a button and/or by a voice command.

Alternatively, a calculation formula can be made available on the basis of the data set in the transportation vehicle 10. To automatically detect a possibly planned coupling maneuver of the driver 16, the actual change in position of the trailer coupling 20 of the trailer 12 is compared with the calculation formula. For example, a gradient of a straight line which is drawn through two positions of the trailer coupling 20 of the trailer can be determined by the calculation formula and on the basis thereof it can be ascertained whether the driver 16 would like to carry out a coupling maneuver.

Both in the case of the reference transportation vehicle for generating the data set and in the case of the transportation vehicle 10, a respective position of the trailer coupling 20 with respect to the reversing camera image 26 may also be assigned a respectively sensed distance between the transportation vehicle 10 and a trailer 12 or between the reference transportation vehicle and the reference trailer. As a result, reliable information can be obtained as to whether or not the driver 16 is actually planning a coupling maneuver to the trailer 12. The respective distances can be determined, for example, by odometry.

The linear region 38 starts approximately at a distance between the transportation vehicle 10 and trailer 12 with a value of approximately 1.7 meters. Starting from a distance of 1.7 meters from the trailer 12, it is therefore possible to reliably implement tracking or monitoring of the trailer coupling 20. If it is then detected that the trailer coupling 20 carries out an approximately linear change in position within the reversing camera image 26, a coupling maneuver which is planned on the part of the driver 16 is assumed. It is beneficial with this procedure that one has to limit oneself exclusively to the image of the reversing camera 14 to be able to anticipate a coupling process or a coupling maneuver which the driver would like to carry out.

However, it is also alternatively possible to take into account both the non-linear region 36 and the linear region 38. In this case it can already be detected earlier—under certain circumstances with a somewhat higher error rate—whether the driver 16 would actually like to perform a coupling maneuver to the trailer 12.

Figure 4:
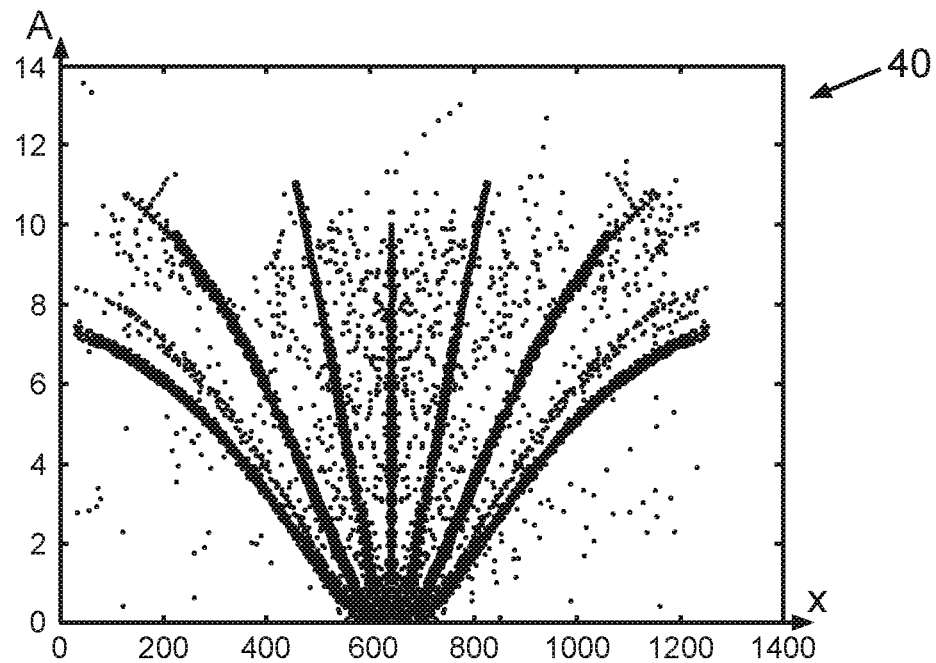
FIG. 4 shows a further illustration of the data set, wherein the position profiles of the trailer coupling of the reference trailer in relation to a transverse direction of the reversing camera image of the reference transportation vehicle assigned to respective distances between the reference transportation vehicle and the reference trailer are illustrated.

FIG. 4 shows a further diagram 40 which illustrates a representation of the data set. The transverse direction of the reversing camera image 26 is plotted on the abscissa axis here, wherein a distance between the transportation vehicle and trailer is plotted on the ordinate axis. To automatically detect a coupling maneuver of the driver 16 it is possible to determine exclusively the change in position of the trailer coupling 20 of the trailer 12 in the transverse direction x of the reversing camera image 26 in relation to a respective distance between the transportation vehicle 10 and the trailer 12. This is compared with the position profiles (illustrated in FIG. 4) of the data set which position profiles themselves comprise exclusively the change in position of the trailer coupling of the reference trailer in the transverse direction x in relation to a respective distance between the reference transportation vehicle and the reference trailer. The respective distance between the trailer coupling 20 of the trailer 12 in the transportation vehicle 10 or between the trailer coupling of the reference trailer and the reference transportation vehicle in the data set can in turn be determined by odometry.

It becomes clear that a linear profile in the direction of the target region is already present at a relatively large distance when only the transverse direction x is considered. Even in the case of a full steering lock (illustrated by the outermost two branches), a linear profile can already be detected starting from a distance of approximately 4 meters between the trailer and the transportation vehicle, and at smaller steering angles it can be detected even earlier. Therefore, this approach offers the benefit that a coupling maneuver of the driver 16 can already be detected very early, in particular, earlier than if the transverse direction x and the vertical direction y are considered—as illustrated in FIG. 3.

For example, the change in position of the trailer coupling 20 of the trailer 12 can be followed in a range between 2 to 4 meters distance between the transportation vehicle 10 and the trailer 12. A trend line can also be drawn through a plurality of points here to keep the influence of steering corrections of the driver 16 low. If an approximately linear profile is present in the target region, a planned coupling maneuver of the driver 16 is assumed and activation of the trailer coupling assistant 18 is offered to the driver. However, in contrast to taking into account the transverse direction x and the vertical direction y this can lead to a somewhat higher error rate with respect to reliable detection of a coupling maneuver which is actually planned by the driver 16. Therefore, overall a method and a system 32 for automatically detecting a coupling maneuver of a transportation vehicle 10 to a trailer 12 have been explained, which method and system 32 provide the benefit that the driver 16 no longer has to activate the trailer coupling assistant 18 autonomously. Instead, the driver 16 autonomously receives a proposal that the trailer coupling assistant 32 will be activated if a coupling maneuver to the trailer 12 which has been planned by the driver 16 has been detected.

LIST OF REFERENCE SYMBOLS

10 Transportation vehicle
12 Trailer
14 Reversing camera
16 Driver
18 Trailer coupling assistant
20 Trailer coupling of the trailer
22 Trailer coupling of the transportation vehicle
24 Tow bar of the trailer
26 Reversing camera image of the reversing camera
28 Transverse directional axis
30 Vertical directional axis
32 System
34 Diagram
36 Non-linear region
38 Linear region
40 Diagram
x Transverse direction of the reversing camera image
y Vertical direction of the reversing camera image
A Distance between transportation vehicle and trailer

The invention claimed is:

1. A system for automatically detecting a coupling maneuver of a transportation vehicle to a trailer, wherein the system performs a method for automatically detecting the coupling maneuver of the transportation vehicle to the trailer, wherein the method comprising:

sensing a change in position of a trailer coupling of the trailer within a reversing camera image of the transportation vehicle;

providing a data set that includes position profiles for a plurality of coupling maneuvers carried out during reversing of a reference transportation vehicle to a trailer coupling of a reference trailer, wherein the position profiles characterize changes in position of the trailer coupling within a reversing camera image of the reference transportation vehicle;

comparing the change in position of the trailer coupling with the position profiles of the data set or providing a calculation formula based on the data set and comparing the change in position of the trailer coupling with the calculation formula; and outputting an inquiry as to whether a driver of the transportation vehicle requests automatically activated trailer coupling assistance for the transportation vehicle in response to determination that there is a predefined degree of correspondence to one of the position profiles or to the calculation formula, wherein assistance includes longitudinal guidance and/or transverse guidance of the transportation vehicle to assist the coupling maneuver, wherein automatic activation of the trailer coupling assistance takes place only in response to confirmation of the inquiry.

2. A method for automatically detecting a coupling maneuver of a transportation vehicle to a trailer, the method comprising:

sensing a change in position of a trailer coupling of the trailer within a reversing camera image of the transportation vehicle;

providing a data set that includes respective position profiles for a plurality of coupling maneuvers carried out during reversing of a reference transportation vehicle to a trailer coupling of a reference trailer, wherein the position profiles characterize respective changes in position of the trailer coupling within a reversing camera image of the reference transportation vehicle;

comparing the change in position of the trailer coupling with the position profiles of the data set or providing a calculation formula based on the data set and comparing the change in position of the trailer coupling with the calculation formula; and outputting an inquiry as to whether a driver of the transportation vehicle requests automatically activated trailer coupling assistance for the transportation vehicle in response to determination that there is a predefined degree of correspondence to one of the position profiles or to the calculation formula, wherein assistance includes longitudinal guidance and/or transverse guidance of the transportation vehicle to assist the coupling maneuver, wherein automatic activation of the trailer coupling assistance takes place only in response to confirmation of the inquiry.

3. The method of claim 2, further comprising assigning a position of the trailer coupling, with respect to the reversing camera image, to a sensed distance between the reference transportation vehicle and the reference trailer or between the transportation vehicle and the trailer.

4. The method of claim 3, wherein the distances are determined by odometry.

5. The method of claim 2, wherein the data set is divided into a non-linear region, in which the position profiles are curved, and a linear region, in which the position profiles are at least predominantly straight to a coupling region, wherein only the linear region is taken into account, or both the non-linear and the linear region are taken into account when the change in position of the trailer coupling is compared with the position profiles of the data set.

6. The method of claim 2, wherein the change in position of the trailer coupling of the trailer is determined exclusively in a transverse direction of the reversing camera image in relation to a distance between the transportation vehicle and the trailer, wherein the change in position of the trailer coupling of the trailer is compared with the position profiles of the data set, wherein the position profiles consist of the change in position of the trailer coupling of the reference trailer in the transverse direction in relation to a respective distance between the reference transportation vehicle and the reference trailer.

7. The method of claim 2, wherein the comparison of the change in position of the trailer coupling with the position profiles of the data set takes the change in position of the trailer coupling in a transverse direction and a vertical direction of the reversing camera image into account.

8. The method of claim 2, wherein sensing of the change in position of the trailer coupling within the reversing camera image includes determining individual positions of the trailer coupling on the reversing camera image, wherein a trend line is drawn through the determined individual positions that is compared with the position profiles of the data set during the comparison of the change in position of the trailer coupling.

* * * * *